(12) United States Patent
Huang et al.

(10) Patent No.: US 10,067,613 B2
(45) Date of Patent: Sep. 4, 2018

(54) TOUCH DISPLAY DEVICE

(71) Applicant: Shenzhen China Star Optoelectronics Technology Co., Ltd., Shenzhen, Guangdong (CN)

(72) Inventors: Yao Li Huang, Guangdong (CN); Jun Xia, Guangdong (CN); Jianxing Xie, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/417,869

(22) PCT Filed: Jan. 21, 2015

(86) PCT No.: PCT/CN2015/071211
§ 371 (c)(1),
(2) Date: May 9, 2016

(87) PCT Pub. No.: WO2016/086524
PCT Pub. Date: Jun. 9, 2016

(65) Prior Publication Data
US 2016/0246398 A1   Aug. 25, 2016

(30) Foreign Application Priority Data

Dec. 4, 2014 (CN) .......................... 2014 1 0728370

(51) Int. Cl.
*G06F 3/044* (2006.01)
*G02F 1/133* (2006.01)
(Continued)

(52) U.S. Cl.
CPC .......... *G06F 3/044* (2013.01); *G02F 1/13306* (2013.01); *G02F 1/13338* (2013.01);
(Continued)

(58) Field of Classification Search
CPC ... G02F 2001/134372; G02F 1/134309; G02F 1/136286; G02F 1/13306; G02F 1/13338; G06F 3/044
See application file for complete search history.

(56) References Cited

U.S. PATENT DOCUMENTS

2012/0218199 A1* 8/2012 Kim ....................... G06F 3/0412
345/173
2013/0257794 A1* 10/2013 Lee ......................... G06F 3/041
345/174
(Continued)

FOREIGN PATENT DOCUMENTS

CN          103699284 A       4/2014
CN          104022127 A       9/2014
(Continued)

OTHER PUBLICATIONS

International Search Report and Written Opinion, dated Jan. 21, 2015, China.

*Primary Examiner* — Abhishek Sarma
(74) *Attorney, Agent, or Firm* — Kim Winston LLP

(57) ABSTRACT

Disclosed is a touch display device which belongs to the technical field of displays, and solves the technical problem that the existing capacitive touch screens are thick. The touch display device comprises an array of common electrodes and a plurality of address lines, each of the common electrodes being connected to a drive circuit through an address line respectively. When an image is displayed, the common electrode is connected to a common voltage output end through the address line, and when a touch signal is scanned, the common electrode is connected to a touch signal processor through the address line.

6 Claims, 5 Drawing Sheets

(51) Int. Cl.
*G02F 1/1333* (2006.01)
*G02F 1/1343* (2006.01)
*G02F 1/1362* (2006.01)

(52) U.S. Cl.
CPC .. *G02F 1/134309* (2013.01); *G02F 1/136286* (2013.01); *G02F 2001/134372* (2013.01)

(56) References Cited

U.S. PATENT DOCUMENTS

| | | | | |
|---|---|---|---|---|
| 2014/0320767 | A1* | 10/2014 | Xu | G06F 3/0412 |
| | | | | 349/12 |
| 2016/0259445 | A1* | 9/2016 | Yang | G06F 3/044 |
| 2016/0294386 | A1* | 10/2016 | Yang | G06F 3/0416 |

FOREIGN PATENT DOCUMENTS

| | | |
|---|---|---|
| CN | 104022128 A | 9/2014 |
| CN | 104407757 A | 3/2015 |
| KR | 1020140004887 A | 1/2014 |

\* cited by examiner

TOUCH DISPLAY DEVICE

The present application claims benefit of Chinese patent application CN201410728370.7, entitled "Touch display device" and filed on Dec. 4, 2014, the entirety of which is incorporated herein by reference.

TECHNICAL FIELD

The present disclosure relates to the technical field of displays, and in particular, to a touch display device.

TECHNICAL BACKGROUND

With the development of display technologies, liquid crystal display devices have become the most common display devices.

In the meanwhile, with the popularization of smart electronic products, capacitive touch screens are also widely used in electronic products, such as cell phones, tablet PCs, etc. Currently, capacitive touch screens mainly use one glass solution (OGS), on-cell, and in-cell technologies. Compared with OGS and on-cell technologies, in-cell technology is superior in production process, and products using it are thinner, lighter, and more transparent.

In the process of implementing the present disclosure, the inventor found that the prior arts suffer from at least the following problem. That is, in the existing capacitive touch screens, two electrode layers, one for Tx circuit and the other for Rx circuit, are needed, which renders capacitive touch screens thick.

SUMMARY OF THE INVENTION

The objective of the present disclosure is to provide a touch display device to solve the technical problem that the existing capacitive touch screens are thick.

The present disclosure provides a touch display device which comprises: a sub-pixel unit array formed by a plurality of gate lines and a plurality of data lines, each of the sub-pixel units being provided a thin film transistor (TFT) and a pixel electrode therein; and an array of common electrodes and a plurality of address lines, each of the common electrodes being connected to a drive circuit through an address line respectively, wherein when an image is displayed, the common electrodes each are connected to a common voltage output end in the drive circuit through the address line, and when a touch signal is scanned, the common electrodes each are connected to a touch signal processor in the drive circuit through the address line.

Further, one common electrode corresponds to one or more of the sub-pixel units.

In one embodiment, the common electrode is located between the TFT and the pixel electrode. A first insulating layer is provided between the thin film transistor and the common electrode, and a second insulating layer is provided between the common electrode and the pixel electrode.

Further, the address line and the pixel electrode are located on a same layer, and the common electrode is connected to the address line through a via hole which is provided in the second insulating layer.

Or, the address line, and a source and a drain of the TFT are located on a same layer, and the common electrode is connected to the address line through a via hole which is provided in the first insulating layer.

In another embodiment, the pixel electrode covers the drain of the TFT, and the common electrode is located above the pixel electrode, with the first insulating layer located therebetween.

Further, the common electrode is covered with the second insulating layer on which the address line is provided, and the common electrode is connected to the address line through a via hole which is provided in the second insulating layer.

Or, the second insulating layer is located between the common electrode and the first insulating layer, and the address line is arranged between the first insulating layer and the second insulating layer, and the common electrode is connected to the address line through a via hole which is provided in the second insulating layer.

Or, the address line covers the common electrode.

Preferably, the address lines each are made of a metal material or a transparent conductor material.

The present disclosure achieves the following beneficial effects. According to the touch display device provided in the present disclosure, the displayed image and the touch signal are scanned at different times. When an image is displayed, the common electrode is connected to a common voltage output end in the drive circuit through the address line, forming an electric field between the common electrode and the pixel electrode; and when a touch signal is scanned, the common electrode is connected to a touch signal processor in the drive circuit through the address line, so as to receive the touch signal. Since each of the common electrodes is connected to a drive circuit through an address line respectively, i.e. each of the common electrodes in the array of common electrodes is independently connected to the drive circuit, the touch display device provided in the present disclosure is able to achieve the sensing of the touch signal merely by the array of common electrodes, thereby decreasing the thickness of the capacitive touch screen.

Other features and advantages of the present disclosure will be further explained in the following description, and will partly become self-evident therefrom, or be understood through the implementation of the present disclosure. The objectives and advantages of the present disclosure will be achieved through the structures specifically pointed out in the description, claims, and the accompanying drawings.

BRIEF DESCRIPTION OF THE DRAWINGS

For further illustrating the technical solutions provided in the embodiments of the present disclosure, a brief introduction will be given below to the accompanying drawings involved in the embodiments.

DETAILED DESCRIPTION OF THE EMBODIMENTS

The present disclosure will be explained in detail with reference to the embodiments and the accompanying drawings, so as to fully understand how to solve the technical problem and achieve the technical effects by the technical means according to the present disclosure, and thus implement the same. It should be noted that as long as there is no structural conflict, any of the embodiments and any of the technical features thereof may be combined with one another, and the technical solutions obtained therefrom all fall within the scope of the present disclosure.

Figure 1:
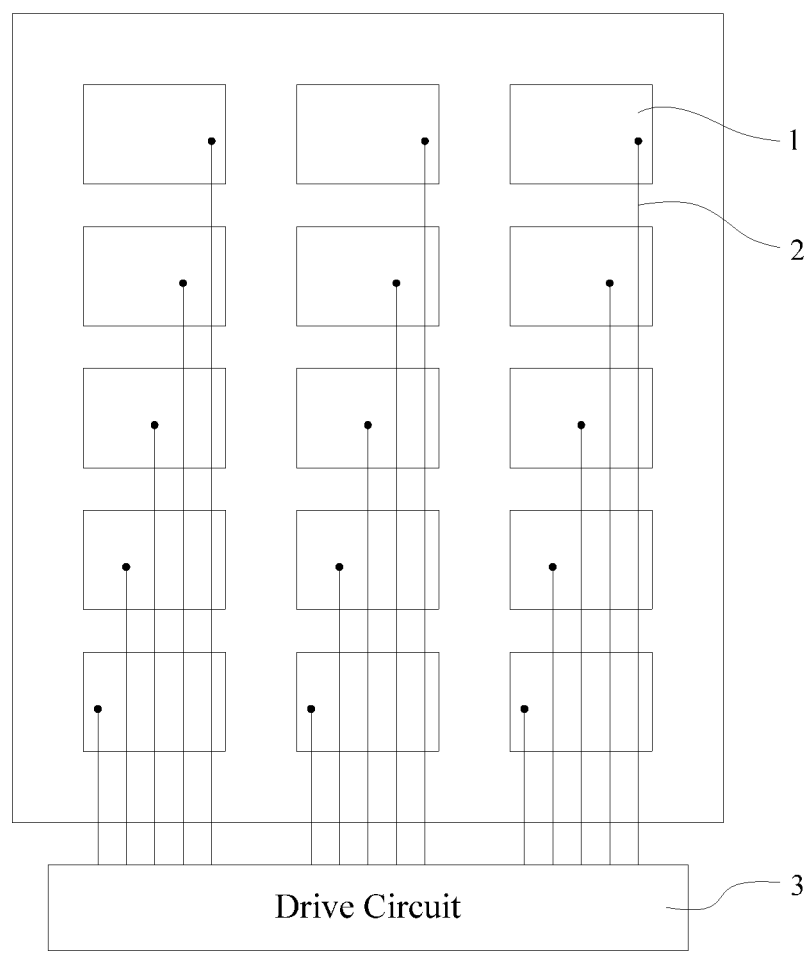
FIG. 1 schematically shows a touch display device according to the embodiments of the present disclosure.

The present disclosure provides a capacitive touch display device which comprises an array substrate, a color filter substrate, a drive circuit and the like. The array substrate comprises a sub-pixel unit array formed by a plurality of gate lines and a plurality of data lines, each of the sub-pixel units being provided a thin film transistor (TFT) and a pixel electrode therein. As shown in FIG. 1, the array substrate in the touch display device further comprises an array of common electrodes 1, and a plurality of address lines 2, each of the common electrodes 1 being connected to a drive circuit 3 through an address line 2 respectively.

According to the touch display device provided in the present disclosure, the displayed image and the touch signal are scanned at different times. When an image is displayed, the common electrode 1 is connected to a common voltage output end in the drive circuit 3 through the address line 2, forming an electric field between the common electrode 1 and the pixel electrode; and when a touch signal is scanned, the common electrode 1 is connected to a touch signal processor in the drive circuit 3 through the address line 2, so as to receive the touch signal.

Since each of the common electrodes 1 is connected to a drive circuit 3 through an address line 2 respectively, i.e. each of the common electrodes 1 in the array of common electrodes 1 is independently connected to the drive circuit 3, the touch display device provided in the present embodiment of the present disclosure is able to achieve the sensing of the touch signal merely by the array of common electrodes 1, thereby decreasing the thickness of the capacitive touch screen.

In addition, the touch display device provided in the present embodiment adopts the self-capacitive touch technology, so that each of the sensors (namely the common electrodes) can be scanned and received simultaneously by means of a common mode, in-phase, and same frequency signal, which reduces the time for scanning the touch signal, and increases the time for scanning the displayed image, thereby providing a favorable condition for a higher resolution of display. By adopting the self-capacitive touch technology in the embodiments of the present disclosure, a false touch report will not arise. And in case there is mist or dews on the screen, the touch report will still be carried on normally. Therefore, by using the self-capacitive touch technology, touch performance such as touch report rate and signal-to-noise ratio are improved.

Embodiment 1

Figure 2:
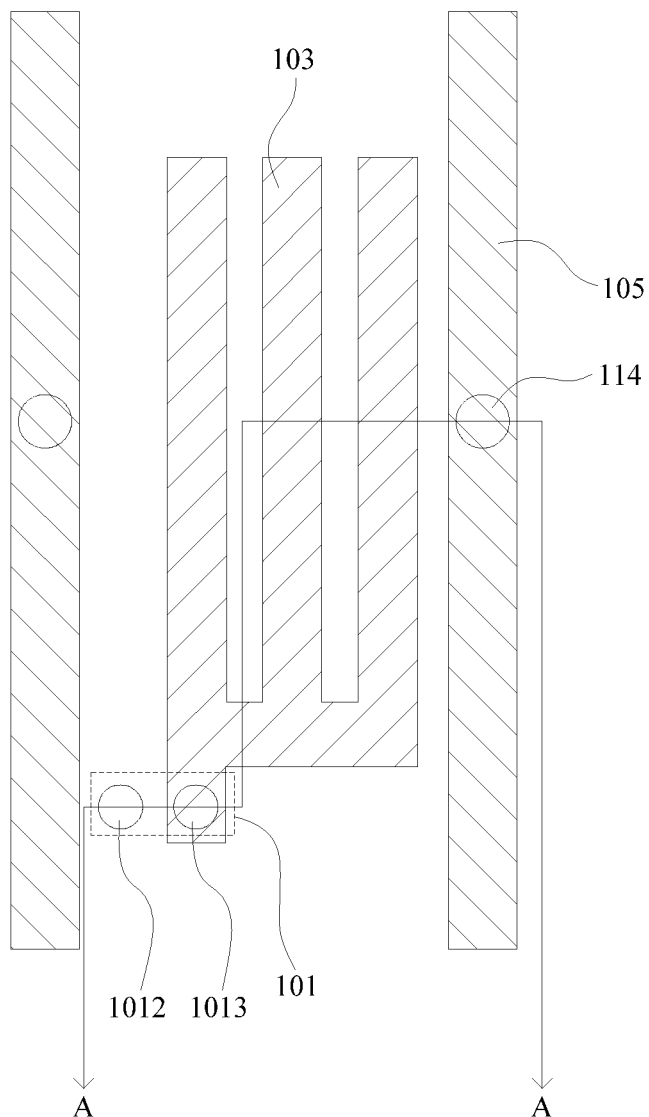
FIG. 2 schematically shows a plan view of an array substrate in the touch display device according to embodiment 1 of the present disclosure.
Figure 3:
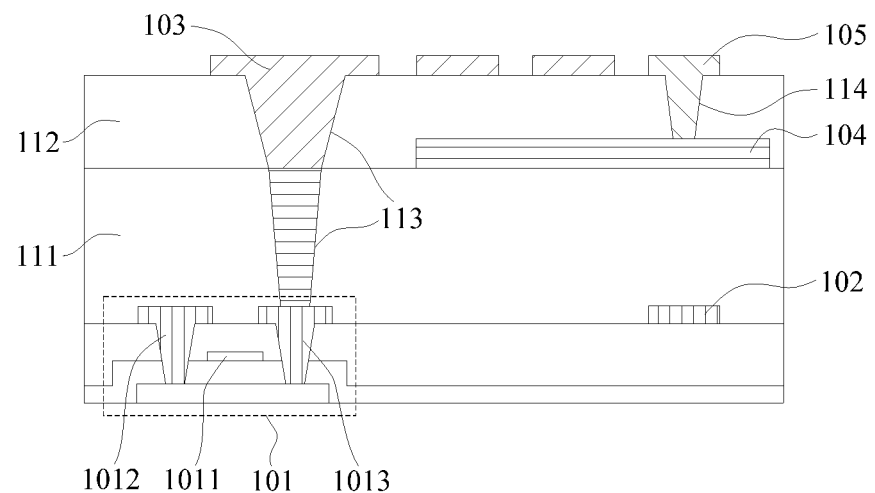
FIG. 3 schematically shows a cross-section along line A-A of FIG. 2.

The present embodiment provides a touch display device. As shown in FIGS. 2 and 3, the array substrate in the touch display device comprises: a sub-pixel unit array formed by a plurality of gate lines (not shown in the Figs.) and a plurality of data lines 102, each of the sub-pixel units being provided a TFT 101 (including a gate 1011, a source 1012, and a drain 1013) and a pixel electrode 103 therein; and an array of common electrodes 104 and a plurality of address lines 105, each of the common electrodes 104 being connected to a drive circuit through an address line 105 respectively, wherein one common electrode 104 corresponds to one or more of the sub-pixel units.

In the present embodiment, the common electrode 104 is located between the TFT 101 and the pixel electrode 103. A first insulating layer 111 is provided between the TFT 101 and the common electrode 104, and a second insulating layer 112 is provided between the common electrode 104 and the pixel electrode 103. The pixel electrode 103 is connected to the drain 1013 of the TFT 1 through a via hole 113 which runs through the first insulating layer 111 and second insulating layer 112.

The address lines 105 each can be made of a metal material, and are located on a same layer as the pixel electrode 103. The common electrode 104 is connected to the address line 105 through a via hole 114 which is provided in the second insulating layer 112. Preferably, the address line 105 is provided right above the data line 102, i.e. the orthogonal projection of the address line 105 coincides with the data line 102, which enables the address line 105 and the data line 102 to be both shielded by a same black matrix on the color filter substrate, thus avoiding the influence on the aperture ratio of the touch display device because of the address line 105.

Figure 4:
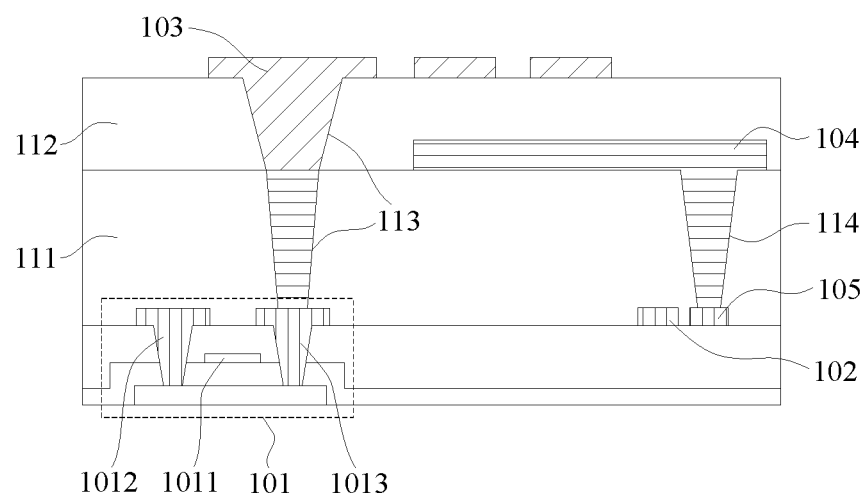
FIG. 4 schematically shows a cross-section of the array substrate in the touch display device according to the second implementing method thereof in embodiment 1 of the present disclosure.

FIG. 4 shows another method of implementing the touch display device provided by the present embodiment. In this case, the address line 105, the data line 102, and the source 1012 and the drain 1013 of the TFT 101 are located on a same layer. The common electrode 104 is connected to the address line 105 through a via hole 114 which is provided in the first insulating layer 111. Since the data line 102 and the address line 105 can be formed in one patterning procedure, there is no need to perform an additional patterning procedure solely for forming the address line. Therefore, the number of patterning procedures can be reduced by once.

Preferably, the address line 105 and the data line 102 are arranged close to each other side by side, and the widths thereof are adjusted to such a degree that they can both be shielded by a same black matrix on the color filter substrate, thus avoiding the influence on the aperture ratio of the touch display device because of the address line 105.

The touch display device provided in the present embodiment is able to achieve the sensing of touch signal merely by the array of common electrodes, which can decrease the thickness of the capacitive touch screen, improve touch performance such as touch report rate and signal-to-noise ratio, and meanwhile, increase the scanning time, and thus provide a favorable condition for a higher resolution of display.

In addition, according to the array substrate provided in the present embodiment, the touch sensing electrodes (namely the common electrodes) thereof can be obtained by the existing patterning procedure without improvements on manufacturing equipments.

Compared with the existing on-cell technology, the in-cell technology used in the present embodiment does not require a film structure on the outer surface of the array substrate and the color filter substrate. Therefore, after the patterning procedure is finished, the array substrate and the color filter substrate can be thinned to further decrease the thickness of the capacitive touch screen.

It should be noted that, in other embodiments, the address lines each can be made of a transparent conductor material, such as indium tin oxide (ITO), graphene, metal mesh, etc., thus rendering it possible to arrange the address lines in the display area outside the black matrix. Besides, the number of patterning procedures can still be reduced by once. For example, as shown in FIG. 3, if the pixel electrode 103 and the address line 105 are made of a same transparent conductor material, the pixel electrode 103 and the address line 105 can be formed in a same patterning procedure. Thus there is no need to perform a patterning procedure solely for forming the address line.

Embodiment 2

Figure 5:
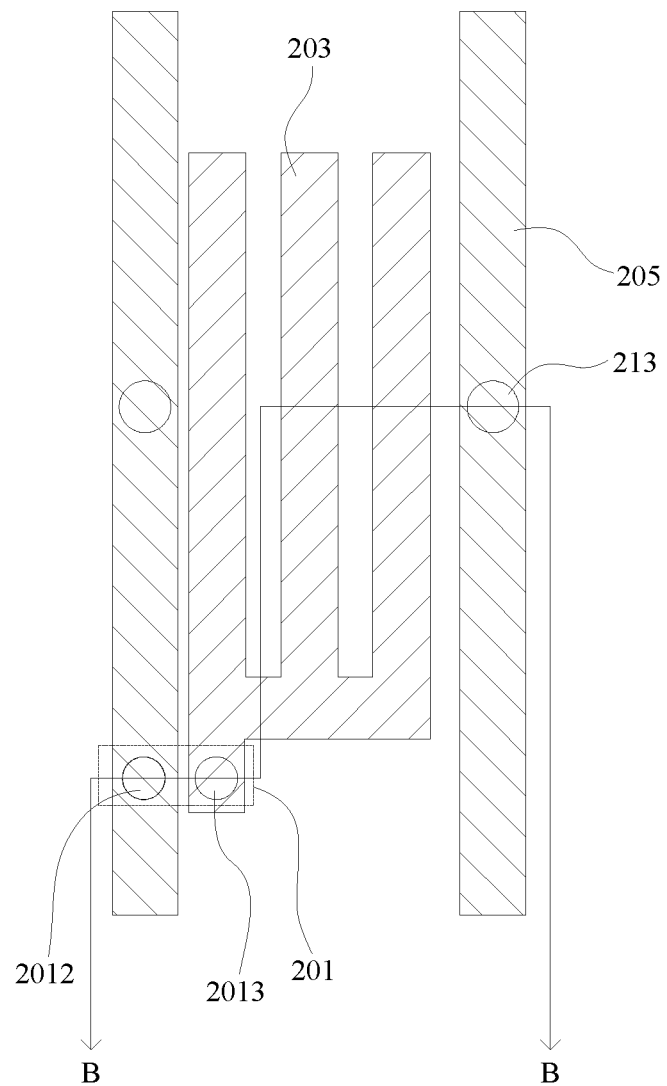
FIG. 5 schematically shows a plan view of an array substrate in the touch display device according to embodiment 2 of the present disclosure.
Figure 6:
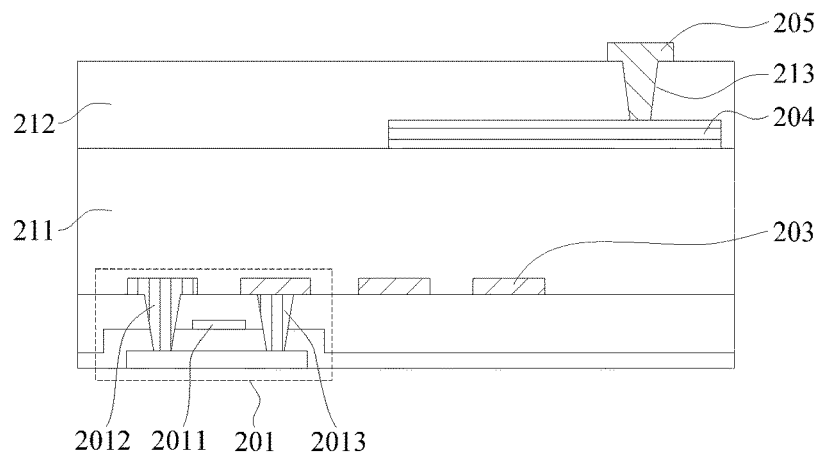
FIG. 6 schematically shows a cross-section along line B-B of FIG. 5.

The present embodiment provides a touch display device. As shown in FIGS. 5 and 6, the array substrate in the touch display device comprises: a sub-pixel unit array formed by a plurality of gate lines (not shown in the Figs.) and a plurality of data lines (not shown in the Figs.), each of the sub-pixel units being provided a TFT 201 (including a gate 2011, a source 2012, and a drain 2013) and a pixel electrode 203 therein; and an array of common electrodes 204 and a plurality of address lines 205, each of the common electrodes 204 being connected to a drive circuit through an address line 205 respectively, wherein one common electrode 204 corresponds to one or more of the sub-pixel units.

In the present embodiment, the pixel electrode 203 directly covers the drain 2013 of the TFT 201. The common electrode 204 is located above the pixel electrode 203, and a first insulating layer 211 is provided therebetween.

As shown in FIG. 6, the common electrode 204 is covered with a second insulating layer 212 on which the address line 205 is provided. The common electrode 204 is connected to the address line 205 through a via hole 213 which is provided in the second insulating layer 212.

Figure 7:
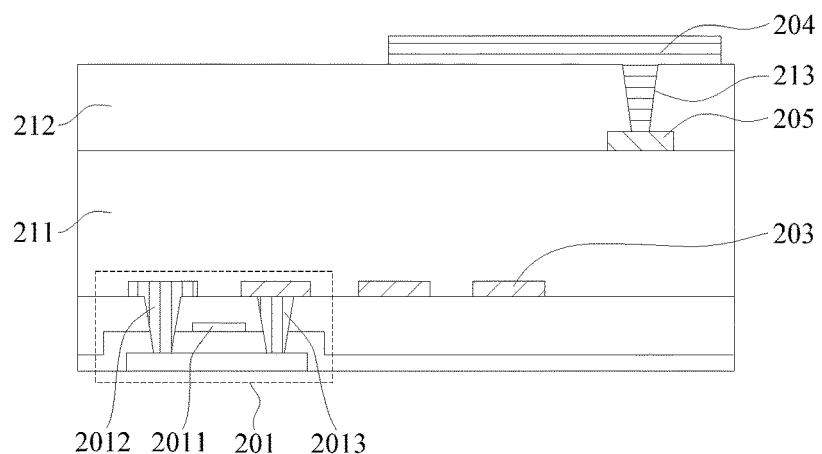
FIG. 7 schematically shows a cross-section of the array substrate in the touch display device according to the second implementing method thereof in embodiment 2 of the present disclosure.

FIG. 7 shows another method of implementing the touch display device provided in the present embodiment. The second insulating layer 212 is located between the common electrode 204 and the first insulating layer 211, and the address line 205 is located between the first insulating layer 211 and the second insulating layer 212. The common electrode 204 is connected to the address line 205 through a via hole 213 which is provided in the second insulating layer 212.

Figure 8:
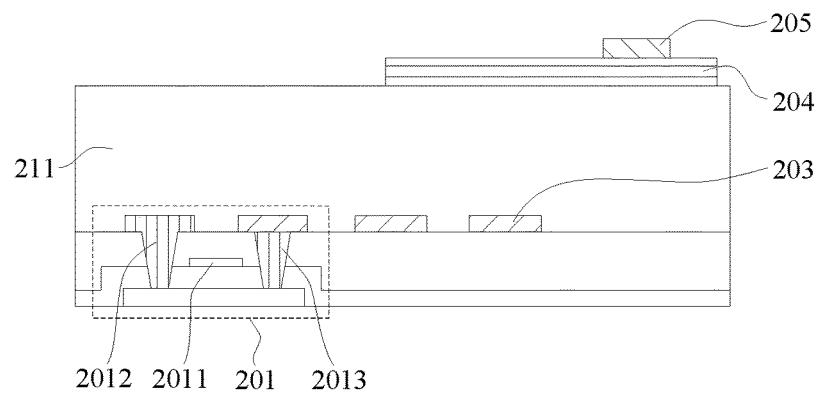
FIG. 8 schematically shows a cross-section of the array substrate in the touch display device according to the third implementing method thereof in embodiment 2 of the present disclosure.

Or, as shown in FIG. 8, the second insulating layer can be omitted, so that the address line 205 directly covers the common electrode 204, thereby further decreasing the thickness of the capacitive touch screen. It should be noted that, since there is no insulating layer between the address line 205 and the common electrode 204, the address line 205 cannot run across the plurality of common electrodes 204 to be connected to a corresponding common electrode 204 (See FIG. 1). Therefore, it is necessary to formulate a reasonable arrangement for the positions and shapes of each of the common electrodes 204, so as to reserve a route for each of the address lines 205.

Compared with embodiment 1, the present embodiment is simpler. Since the pixel electrode 203 directly covers the drain of the TFT 201, it is unnecessary to provide a via hole in the first insulating layer 211 and the second insulating layer 212. Besides, electrical connection is more reliable.

The above embodiments are described only for better understanding, rather than restricting the present disclosure. Anyone skilled in the art can make amendments to the implementing forms or details without departing from the spirit and scope of the present disclosure. The scope of the present disclosure should still be subject to the scope defined in the claims.

The invention claimed is:

1. A touch display device, comprising:
   a sub-pixel unit array formed by a plurality of gate lines and a plurality of data lines, each of the sub-pixel units being provided a thin film transistor and a pixel electrode therein, and
   an array of common electrodes and a plurality of address lines, each of the common electrodes being connected to a drive circuit through an address line respectively,
   wherein when an image is displayed, the common electrodes each are connected to a common voltage output end in the drive circuit through the address line, and
   when a touch signal is scanned, the common electrodes each are connected to a touch signal processor in the drive circuit through the address line,
   wherein a pixel electrode covers a drain of the thin film transistor, and
   wherein a common electrode is located above the pixel electrode, with a first insulating layer located therebetween,
   wherein the address line covers the common electrode directly, without an insulating layer located therebetween, and
   wherein the touch display device is a self-capacitive touch display device.

2. The touch display device according to claim 1, wherein one common electrode corresponds to one or more of the sub-pixel units.

3. The touch display device according to claim 1, wherein the common electrode is located between the thin film transistor and the pixel electrode, and
   a first insulating layer is provided between the thin film transistor and the common electrode, and a second insulating layer is provided between the common electrode and the pixel electrode.

4. The touch display device according to claim 3, wherein the address line and the pixel electrode are located on a same layer,
   the common electrode is connected to the address line through a via hole which is provided in the second insulating layer.

5. The touch display device according to claim 3, wherein the address line, and the source and the drain of the thin film transistor are located on a same layer, and
   the common electrode is connected to the address line through a via hole which is provided in the first insulating layer.

6. The touch display device according to claim 1, wherein the address lines each are made of a metal material or a transparent conductor material.

* * * * *